United States Patent Office 3,417,114
Patented Dec. 17, 1968

3,417,114
METHOD OF MAKING AMIDES FROM MOISTURE
AND ACID-GAS CONTAINING ESTERS
Vincent P. Kuceski, Chicago Heights, Ill., assignor to The
C. P. Hall Company of Illinois, Chicago, Ill., a corporation of Ohio
No Drawing. Continuation of application Ser. No.
209,309, July 12, 1962, which is a continuation-in-part of application Ser. No. 55,850, Sept. 14, 1960.
This application July 20, 1965, Ser. No. 473,522
6 Claims. (Cl. 260—404)

ABSTRACT OF THE DISCLOSURE

Amides are produced by reacting an ester of a carboxylic acid with an amine, using as catalyst an alkoxide of an alkali metal. The ester is first heated to at least 75° C. under a pressure of no more than 500 mm. of mercury to remove moisture and acid gases which would prevent the reaction, and then converted to an amide without heating to initiate the reaction.

---

This application is a continuation of my application Ser. No. 209,309 filed July 12, 1962, which is a continuation-in-part of my application Ser. No. 55,850 filed Sept. 14, 1960, both now abandoned.

This invention relates to a new method of making amides having one of the following three formulae:

$$R \cdot CO \cdot NR_1R_2$$
$$(R'' \cdot OOC)_x R'(CO \cdot NR_1R_2)_y$$

and $$(R_3R_4N \cdot OC)_x R'(CO \cdot NR_1R_2)_y$$

in which R and R' are each a radical selected from the class consisting of branched and straight chain cyclic and acyclic aliphatic and aromatic, saturated and unsaturated hydrocarbons and hydroxy-substituted hydrocarbons, and R may be a keto-substituted hydrocarbon other than an alpha- or beta- keto-substituted hydrocarbon, R contains 2 to 21 carbon atoms, R' contains 0 to 51 carbon atoms, and R'' is a straight or branched chain alkyl radical from an alcohol of 1 to 4 carbon atoms; $NR_1R_2$ and $NR_3R_4$ are each selected from the class consisting of dimethyl amine, diethyl amine, di-n-propyl amine, methyl ethyl amine, methyl n-propyl amine, ethyl n-propyl amine, piperazine, piperidine and morpholine radicals and may be the same or different; and $x$ and $y$ are whole numbers greater than 0 that total 2 to 4.

The invention includes certain new amides.

The amides are made by reacting an ester with anhydrous secondary amine in the presence of a catalyst which is an alkali metal alkoxide derived from a monohydroxy or polyhydroxy alcohol, and may contain one or more hydroxy groups. The process is applicable to the treatment of esters with a boiling point substantially above that of water. In the preliminary stage of the process the ester is made anhydrous and degassed by subjecting it to heat and reduced pressure—the temperature and pressure being dependent upon the boiling point of the ester. After this preliminary stage, the catalyst and anhydrous amine are added, the catalyst being preferably added first and thoroughly mixed with the ester before adding the amine. Ordinarily, the esters which are sold commercially as "anhydrous" are not sufficiently anhydrous to prevent consumption of the catalyst by reason of the reaction of water with the alkoxide and consequent slowing of the reaction and such esters are subjected to heat and vacuum as herein described to render them sufficiently anhydrous for efficient production of amides. Such heat and vacuum treatment removes acid gases (such as $CO_2$, $SO_3$, $SO_2$ and $H_2S$, etc.) to which the esters are exposed under normal conditions of handling, which in the presence of moisture form acids which use up the alkoxide catalyst.

It has been found that when esters have been heated with agitation for 1 hour or more under normal pressure to a temperature of at least 150° C., at which temperature all moisture and gases would be expected to be removed, the reaction with the amine did not take place, even in the presence of excess catalyst. The identical ester, after being subjected for the same period of time to a temperature of at least 75° C. and a pressure of no more than 500 mm. of mercury (absolute), such conditions closely approaching the boiling point of the ester, allowed the reaction producing the amide to proceed at a rate satisfactory for commercial production; the higher the vacuum the better, because of the greater amount of deleterious acid gases removed.

The following equation typifies the reaction, using an ester of a monocarboxylic acid and a secondary amine:

$C_7H_{15} \cdot COOCH_3 + NH(CH_3)_2$ (Alkali
　　Metal Alkoxide)$\rightarrow C_7H_{15}CON(CH_3)_2 + CH_3OH$ The ester may be an ester of a mono-, di-, tri- or tetra-carboxylic acid. If the ester contains two or more ester groups, the resulting amide may contain one or more ester groups, depending upon the extent to which the ester groups are converted to amide groups.

The carboxylic acid ester is advantageously a naturally occurring glyceride, such as found in cottonseed oil, coconut oil, soyabean oil, castor oil, fish oil, or other vegetable or animal oil or fat, but may be derived from any one of various other natural or synthetic sources, such as foots, pitches, etc. The methyl esters derived from mono-, di-, tri- and tetra-carboxylic acids are of particular importance, such as methyl acetate, propionate, butyrate, hexoate, caproate, caprylate, caprate, laurate, myristate, palmitate, stearate, oleate, linoleate, linolenate, dihydroxystearate, aleuritate (trihydroxy palmitate) and ricinoleate; and esters of dibasic, tribasic and tetrabasic acids such as the neutral methyl esters of adipic, sebacic, isosebacic, dilinoleic acid, succinic, pimelic, citric, aconitic, tricarballylic, trilinoleic acid, pyromellitic etc. acids. The acid of the ester may be saturated or unsaturated cyclic such as benzoic acid, phthalic acid, terephthalic acid, isophthalic acid, cyclohexanecarboxylic acid, phenylpropionic acid, abietic acid and cinnamic acid, etc. Also the acid of the acid of the ester may be saturated or unsaturated or hydroxy-substituted dibasic acids such as malic acid, maleic acid, and fumaric acid. Also other acids such as keto-acids, for instance levulinic acid, are included. Instead of the methyl ester, any ester of an alcohol of 1 to 4 carbon atoms may be used. Esters and mixed esters of commercial purity can be used.

The metal of the alkoxide catalyst can be sodium, potassium, lithium, caseium or rubidium. Ordinarily the alcohol from which it is derived is a saturated aliphatic alcohol but it may be unsaturated. The alcohol radical should usually correspond to the alcohol of the ester used in the reaction to prevent the introduction of an additional alcohol into the system. The alcohol group of the catalyst is advantageously an alkyl group of 1 to 3 or 4 carbon atoms per OH group. It may be derived from a monohydric, dihydric, trihydric, tetrahydric alcohol or other polyhydric alcohol. The following alkoxides of sodium, etc. are representative: methoxide, ethoxide, propoxide (all isomers), butoxide (all isomers), glyceroxide, ethyleneglycoxide, diethyleneglycoxide.

It is known that the amides to which the invention relates can be obtained by reacting an amine with an ester at elevated temperature. A primary advantage in using a catalyst as contemplated by this invention, is that when lower molecular weight amines are employed, such as those which are vaporized at the temperatures utilized, they are consumed in the reaction producing the amide before their respective solubility limits are exceeded in the reaction mixture. Excellent yields are obtained within periods of time that are commercially feasible.

Higher temperatures accelerate the reaction to a certain degree, but the reaction rate slows at temperatures higher than about 100° C. because of the destruction of the catalyst as shown by the following possible reaction:

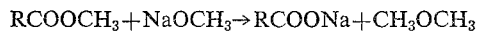

$$RCOOCH_3 + NaOCH_3 \rightarrow RCOONa + CH_3OCH_3$$

Substantiation of this reaction is found in the fact that dimethyl ether has been detected as a product of a reacton carried out above 100° C.

A more readily discernible advantage in using a catalyst is seen when an amide is to be made with some ester which is unstable or polymerizes at the higher temperature required when no catalyst is used. The acrylates and methacrylates are illustrative of esters which polymerize readily, such as methyl, butyl, 2-ethylhexyl, octyl, pelargonyl, docyl, lauryl, stearyl and palmityl acrylates and methacrylates. Vinyl type esters, hydroxy esters and diesters are included. The diesters can be reacted with diamines, such as by reacting dimethyl sebacate, etc. with piperazine, etc. to produce chain compounds.

The reaction is carried out in the presence of 0.01 to 5.0 parts of alkoxide catalyst per 100 parts of the anhydrous ester. The efficient amount of catalyst varies with the molecular weight of the alkoxide. The catalyzed amidation reaction gives evidence of being exothermic immediately after the addition of catalyst and amine to the ester and usually, but not necessarily, the initial temperature of the ester is not above room temperature, particularly for the lower boiling amines. Such lower boiling amines (and even the higher boiling amines) can be vaporized and be bubbled through a mixture of the ester and catalyst, or passed countercurrent to such a mixture in a suitable tower. The temperature of the reaction mixture (or the liquid phase of the reaction mixture) at the start of the reaction may be as low as zero or even −20° C. This is a low temperature reaction so there is no need of supplying heat to it, although in the final stage of the reaction, heat may be used, and it is advantageously used for removal of the unreacted amine.

The reaction is most economically carried out with an excess of amine, e.g. with 1 to 1.5 equivalents of amine for each ester group to be changed to an amide group. More amine may be present, but such greater excess does not enter into the reaction and must eventually be separated from the amide that is produced.

The following examples include as Examples 1 and 2 experimental data to illustrate, by comparison, the beneficial effects of the improved process of this invention.

EXAMPLE 1

Four hundred twenty-eight pounds of commercial methyl caproate with an acid number of 2.96 (mgs. of KOH per gram) and a moisture content of 0.074 percent is charged to a 100-gallon reactor equipped with agitator and gas heaters. The ester is heated with agitation to a temperature of 150° C. in order to distill out the moisture and gases dissolved in the ester. Approximately 21 pounds of the ester is distilled off over a period of 2 hours. The reaction mixture is then cooled to 35° C. and 4.28 pounds of sodium methoxide dissolved in 15 pounds of anhydrous methanol is added to the reactor. Then 114 pounds of dimethyl amine is added to the reaction mixture over a period of 2 hours. At the end of 2 hours no temperature rise is noted and therefore another 4.28 pounds of sodium methoxide is added. The agitation is continued for one hour longer and with no temperature rise noted. No reaction is noted, and this time the amount of catalyst added is doubled, with no better results. A heavy gel forms which may be instrumental in hindering a reaction producing the amide. A gas-liquid chromatographic analysis shows that no amide is produced.

EXAMPLE 2.—N,N-dimethyl caproamide

In this example the reactor is equipped with means to apply a vacuum to the reaction mixture. Four hundred twenty-eight pounds of methyl caproate containing 0.074 percent water and having an acid value of 2.96 (mgs. of KOH per gram) is charged to the reactor and the methyl caproate is heated to 120° C. over a period of 2 hours while at a pressure of 200 mm. Hg, absolute. The heat is applied and agitation continued under the vacuum until approximately 21 pounds of methyl caproate is collected in the receiver. The conditions of this example are the same as that given in the foregoing example with the exception that a vacuum is applied and the ester is heated to a lower temperature. After the 21 pounds of ester are distilled the reaction mixture is cooled to 35° C. and 4.28 pounds of sodium methoxide dissolved in 15 pounds of an hydrous methanol is added to the reactor. Then 114 pounds of dimethyl amine is added over a period of 2 hours while the reaction mixture is agitated. The temperature of the reaction mixture rises from 35° C. to 43° C., indicating that a reaction is taking place. Gas chromatographic analysis of the reaction mixture indicates that the reaction is 70 percent complete in just 2 hours. The reaction is 91 percent complete after 2 hours more, and at the end of a total time of 8 hours the reaction is 97 percent complete. The reaction mixture is then distilled to give a product with boiling point of 123° C. at 25 mm. Hg (absolute). This example shows the beneficial effects of treating the ester to a reduced pressure for the removal of moisture and dissolved gases.

The following examples further illustrate the invention.

EXAMPLE 3.—N,N-dimethyl caprylamide

Commercial methyl caprylate is heated to 145° C. under a pressure (abs.) of 90 mm. Hg with good agitation, and distilled until 5 or 10 percent of the ester is distilled to insure the removal of all moisture and gases from the ester. One hundred fifty pounds of the de-gassed and anhydrous methyl caprylate (0.95 pound moles) with an acid content of 0.1 percent calculated as caprylic acid is mixed with 60 pounds of dimethylamine (1.34 pound moles) at 25° C. and 1 pound of sodium methoxide is added. The mixture is agitated 2 or 3 hours and then heated to 50 or 60° C. to remove the unreacted amine. The product is then washed with water and then distilled. There is obtained a 95 percent yield of 98 percent pure N,N-dimethyl caprylamide. It has a boiling point of 119–121° C. at 60 mm. Hg pressure.

EXAMPLE 4.—N,N-dimethyl myristamide

Five hundred pounds of commercial methyl myristate is charged to a reactor equipped with agitator and gas heating, and heated to a temperature of 150° C. with agitation under a pressure of 125 mm. Hg (absolute) for 2 hours. At the end of 2 hours the ester is analyzed for free acid content and water content. The water content is under 0.005 percent and the acid number is under 0.1. The ester is cooled to 35° C. and 2 pounds of sodium dissolved in 10 pounds of anhydrous methanol is added to the ester as catalyst. Then 114 pounds of dimethyl amine is added while the mixture is agitated. The amine is added over a 2-hour period during which time the temperature rises from 35° C. to 50° C. Agitation is continued for 8 hours more and then heat is applied to remove the excess amine and bring the reaction to a close. When the mixture reaches a temperature of 100° C., water is added to wash out catalyst, soaps and methanol from the reaction product. The washed product is dried and then distilled at a pressure of 400 to 600 microns Hg (absolute) at a temperature of 142–149° C. The freezing point of the product is found to be 29° C. The yield is 93 percent of product which contains 99 percent amide as determined by gas chromatographic analysis. The composition of the amides obtained consists essentially of N,N-dimethyl myristamide with minor amounts of the N,N-dimethyl lauramide and the N,N-dimethyl palmitamide.

EXAMPLE 5.—N,N-dimethyl oleamide

Four hundred pounds of commercial methyl oleate having an acid number of 1 and a moisture content of 0.05 percent is charged to a reactor equipped with agitator, heaters and a source of vacuum. The methyl oleate is heated to 140° C. with good agitation under a pressure of 125 mm. Hg (absolute) over a period of 2 hours. The resulting anhydrous and de-gassed ester is cooled to 40° C. and then 4 pounds of sodium methoxide dissolved in 12 pounds of anhydrous methanol is added to the reactor. Sixty-five pounds of anhydrous dimethylamine is then added to the reactor with agitation over a period of one hour. Although no heat is applied, the temperature of the reactor contents increases from 40° to 48° C. Stirring is continued for 8 hours longer. The reaction mixture is then washed with warm water to remove sodium and amine soaps of oleic acid, dried and then distilled in a Rodney-Hunt wiped film molecular still at a pressure of 1 mm. Hg and at a temperature of 190 to 200° C. The distilled product analyzes 95 percent amide content consisting of 80 percent N,N-dimethyl oleamide and about 5 percent of each of the following amides: N,N-dimethyl myristamide, N,N-dimethyl palmitamide, N,N-dimethyl linoleamide, N,N-dimethyl stearamide.

Five percent of the unreacted methyl oleate remains in the product. The freezing point of the product is −8° C.

EXAMPLE 6.—N,N-dimethyl benzamide

Two hundred seventy pounds of methyl benzoate, purified of moisture and dissolved gases, as described in the foregoing examples at a temperature of 110° C. and a pressure of 200 mm. Hg (absolute) is charged to a reactor together with ¾ pound of sodium dissolved in five pounds of anhydrous methanol. Then 125 pounds of dimethylamine is added to the reactor over a period of one hour. A vigorous reaction ensues with a rise in temperature to 50° C. from a starting temperature of 30° C. After one hour the reaction mixture is heated to 70° C. and methanol and unreacted dimethylamine is collected in the condenser receiver. Sulfuric acid is added to neutralize the sodium methoxide catalyst and the solution is filtered. The solution is freed of water under vacuum and any precipitated salt is filtered off. The water-soluble benzamide is purified by distillation. A first fraction of 72 pounds is collected at a temperature of 125° C. and 3.7 mm. Hg (absolute). Then 192 pounds is collected while the temperature climbs to 132° C. at a pressure of 4.5 mm. Hg (absolute). The liquid residue in the distillation pot weighs 10 pounds. The yield is 71 percent of N,N-dimethyl benzamide (99 percent pure) with a melting point of 42.5 to 43° C. and a solidification point of 42.5° C. Even though pure, the material supercools remaining liquid at room temperature almost indefinitely.

EXAMPLE 7.—N,N,N',N'-tetramethyl succinamide

Two hundred ninety-two pounds of dimethyl succinate is added to a 100-gallon reactor equipped with agitator, means for heating and vacuum connection. The dimethyl succinate is heated to a temperature of 85° C. under a pressure of 200 mm. of Hg (absolute) for a period of 2 hours. The dimethyl ester is then cooled to 30° C. and 4/10 pound of sodium in 10 pounds of anhydrous methanol is added to the reactor contents. Then 200 pounds of liquid dimethyl amine at −5° C. is added rapidly to the reactor contents while agitating vigorously. Small amounts of excess gaseous amine are caught in a receiver cooled with Dry Ice. The temperature of the reactor contents climbs quickly to 40° C. after having been cooled to approximately 15° C. by the addition of the chilled dimethyl amine. The reaction mixture is then heated slowly to 90° C. to drive off excess amine and methanol. The water-soluble product is neutralized with sulfuric acid, filtered to remove precipitated sodium sulfate and then distilled under a low pressure to give a product with a melting point of 83 to 86° C. in 90 percent yield.

EXAMPLE 8.—N,N,N',N'-tetramethyl sebacamide

Dibutyl sebacate 2500 g. (15.9 equivalents) in a 5-liter flask was heated to 130° C. under vacuum of 12 mm. Hg (absolute) to remove all trace of water and dissolved gases present in the ester. The catalyst was prepared by dissolving 0.2 percent by weight of the ester or 5 g. sodium in 45 g. of anhydrous methanol to form the pure, dry, solution of sodium methoxide in methanol. The solution of dibutyl sebacate was then cooled to 49° C. before addition of the catalyst in order to prevent destruction of its catalytic activity, and the catalyst was added to the dry ester while protecting it from moist air. Then 450 g. of the dimethyl amine (10 equivalents) was added during 9 minutes while the temperature of the reactive mixture rose to 58° C. The reaction mixture was then cooled to 30° C. After 14 minutes the temperature stopped rising and the addition of dimethyl amine was renewed until a total of 20 equivalents were added. The addition of the amine was complete after 31 minutes. At this time the temperature was 40° C. Twenty-four minutes later the temperature reached 46° C. and the reaction rate slowed as evidenced by the decline in the temperature. The mixture was allowed to stand overnight without stirring and then it was heated to 130° C. under vacuum until the by-product butanol and excess amine were removed. This was then neutralized with hydrochloric acid to a pH of 5 as shown when 10 grams of the mixture was dissolved in 100 ml. of distilled water, and filtered while hot.

The material had a very high boiling point. Very little distilled at 220° C. and 0.5 mm. Hg (absolute). Therefore it was purified by recrystallization in three to four times its weight of a solvent system composed of 2 parts of benzene and 1 part of iso-octane. The first crystallization gave a product having a melting point of 85° C.; the second recrystallization gave a product having a melting point of 89° C.

EXAMPLE 9.—N,N-dimethyl glutaramide methyl ester and N,N,N',N-tetramethyl glutaramide This preparation illustrates the preparation of two compounds simultaneously and separation of them by distillation. Dimethyl glutarate (40 equivalents) or 3200 grams is dried and degassed as described in the previous examples, using a pressure no greater than 500 mm. Hg (absolute). The resulting 97 percent pure material is placed in a 5-liter flask and to it is added 0.20 percent sodium by weight or 64 grams of 25 percent sodium methoxide solution. Gaseous DMA (dimethyl amine) (30 equivalents) is then added over a 2-hour period. During 30 minutes of this time the temperature of the mixture rises from 25° C. to 56° C. and the mixture thereafter is cooled to maintain the temperature around 60° C. Stirring is continued for a total time of 3.5 hours. The stirring is stopped and the mixture is allowed to stand overnight. The mixture is then placed under vacuum of 12 mm. Hg (absolute) to remove by-product MeOH and some free DMA while heat is slowly applied to raise the temperature to 110° C. When the temperature reaches 110° C. the catalyst is neutralized with 13.9 gms. of $H_2SO_4$ and the salts which formed are separated by filtration. The resulting material is then fractionally distilled to give the following compounds, weights and purities. The following abbreviations are used in the table:

DMG = dimethyl glutarate
DMGME = N,N-dimethyl glutaramide methyl ester
TMG = N,N,N',N'-tetramethyl glutaramide

| Composition | M.Pt., °C. | Pressure, mm. Hg | B.Pt, °C. | Percent |
|---|---|---|---|---|
| Fraction: | | | | |
| 1 _____ 45% DMG, 55% DMGME _____ | | 12.0 | 129-165 | 9.74 |
| 2 _____ 98% DMGME _____ | 7.5 | 12.0 | 165-167 | 37.05 |
| 3 _____ 55% DMGME, 45% TMG _____ | | 0.3 | 103-117 | 3.68 |
| 4 _____ 98% TMG _____ | 40-45 | 0.3 | 117-133 | 47.44 |
| 5 _____ Residue Crude, TMG _____ | | | | 2.09 |

The TMG, upon recrystallization with a small amount of benzene gave a product melting at 50° C.

EXAMPLE 10.—N,N-dimethyl adipamide methyl ester and N,N,N',N-tetramethyl adipamide This material was prepared from dimethyl adipate, which was prepared by esterifying adipic acid with methanol and HCl catalyst. The dimethyl adipate 3480 grams (20 moles) was heated to 120° C. for one hour with vigorous agitation under a pressure of 40 mm. Hg (absolute) to remove moisture and gases. One hundred seventy-four grams of NaOCH$_3$ solution containing the equivalent of 10 grams of sodium was then added after the diester had cooled to 53° C. Gaseous dimethyl amine was then added through a gas dispersion tube to the well-stirred reaction mixture until 20 equivalents of dimethyl amine were added (900 grams). This took place over a period of 2 hours at which time the temperature rose to 72° C. and by-product methanol was removed as a vapor. Agitation was continued 4 hours during which time the temperature dropped to 56° C. During this time the mixture became an opaque tan color and increased in viscosity because of some small amount of gel formation. The temperature was then raised again to 120–130° C. and the mixture agitated under vacuum to remove unreacted dimethyl amine and methanol. The mixture which then consisted of dimethyl adipate, N,N-dimethyl adipamide methyl ester, and N,N,N',N'-tetramethyl adipamide was then cooled to 35° C. and concentrated HCl added slowly until the pH of a 10-gram sample in 100 ml. of distilled water dropped to 5 or 4. Salts of NaCl and dimethyl amine hydrochloride were then filtered off and then the material was distilled in a 2-inch vacuum jacketed Oldershaw column containing 20 plates. The distillation was carried out at a reflux ratio of 10 to 1 and the fraction distilling at 130° C. at 2 mm. Hg (absolute) was found to contain the N,N-dimethyl adipamide methyl ester (M.P. 8.2° C.). The yield of this fraction was approximately 40 percent by weight of the original starting material. The forerun of this distillation consisted almost entirely of dimethyl adipate, while the undistilled residue consisted almost entirely of crude N,N,N',N'-tetramethyl adipamide having a melting point of 70–80° C. The purified product obtained by distillation of this crude residue on a molecular wiped-film still had a melting point of 81–84° C.

EXAMPLE 11.—N,N-dimethyl tallow amide

Four hundred pounds of a commercial tallow are charged to a 100-gallon reactor equipped with agitator and means for applying heat and vacuum. The tallow is heated with agitation to a temperature of 150° C. at a pressure of 50 mm. Hg (absolute) for a period of 1 hour. The reaction mixture is then cooled to 70° C. at which the fat is still molten. One pound of sodium in 10 pounds of anhydrous methyl alcohol is added to the reactor and then 80 pounds of dimethyl amine is added to the well-agitated resulting molten mixture at such a rate that none of the dimethyl amine escaped by reason of the higher temperature. All of the amine is added by the end of 4 hours. The resulting mixture is kept heated to keep the amide and unreacted tallow liquid overnight. The agitation is stopped to allow the separation of by-product glycerine during the night. The glycerine is then separated and the remaining reaction mixture is washed with water. It is distilled at a pressure of 500 microns Hg (absolute) and a temperature of 170–195° C. The product obtained consisted of approximately ⅓ N,N-dimethyl palmitamide and ⅔ N,N-dimethyl stearamide.

Similar procedures to those described above can be used to prepare the following:

| | Boiling Point, °C. | Melting Point, °C. |
|---|---|---|
| N,N,N',N'-tetramethyl malonamide | 157-159$_3$ | (1) |
| N,N,N',N'-tetramethyl oxalamide | | 79.5-84 |
| N,N,N',N'-tetramethyl azeleamide | | 40-41 |
| N,N,N',N'-tetramethyl o-phthalamide | 146$_1$ | |
| N,N,N',N'-tetramethyl iso-phthalamide | | 124-129 |
| N,N-dimethyl o-phthalamide methyl ester | | |
| N,N-dimethyl aleuritamide | | 64-66 |
| N,N-dimethyl levulinamide | 90-95$_{10}$ | |

[1] Sets to glass at −40° C.

When N,N-diethyl meta toluamide was made according to the general procedure of the foregoing examples using diethyl amine instead of dimethyl amine and methyl meta toluate, the reaction proceeded slowly. The boiling point of the product obtained was between 120 and 130° C. at 2 mm. Hg pressure (absolute) for 95 percent of the charge to the still pot. The majority of this material had a boiling range of 124 to 126° C. at said pressure. When dibutyl amine was reacted with methyl laurate by a similar procedure but not included within the process of the application, the N,N-dibutyl lauramide obtained had a freezing point of −15.6° C.

The foregoing examples are illustrative. Inert solvents may be used in the reaction such as benzene, toluene, isopropyl ether, and other hydrocarbons (both cyclic and acyclic); and other solvents miscible in the system may be used. Solvents are sometimes necessary where the reaction product is a material with a melting point well above the temperature of the reaction mixture at its reacting temperature.

The invention is covered in the claims which follow.

What I claim is:

1. The method of producing an amide selected from the class consisting of amides having the formulae:

$$R \cdot CO \cdot NR_1R_2$$

$$(R'' \cdot OOC)_x R'(CO \cdot NR_1R_2)_y$$

and $$(R_3R_4N \cdot OC)_x R'(CO \cdot NR_1R_2)_y$$

in which R is a radical selected from the class consisting of branched and straight chain, cyclic and acyclic, aliphatic and aromatic, saturated and unsaturated, hydrocarbons and hydroxy-substituted hydrocarbons and hydrocarbons keto-substituted on a carbon atom with at least two carbon atoms between said carbon atom and the carbon atom of the carboxyl group, and R' is a radical selected from the class consisting of branched and straight chain, cyclic and acyclic, aliphatic and aromatic, saturated and unsaturated, hydrocarbons and hydroxy-substituted hydrocarbons, R contains 2 to 21 carbon atoms, R' contains 0 to 51 carbon atoms, and R" is an alcohol radical of 1 to 4 carbon atoms; $NR_1R_2$ and $NR_3R_4$ are each selected from the class consisting of dimethyl amine, diethyl amine, di-n-propyl amine, methyl ethyl amine, methyl n-propyl amine, ethyl n-propyl amine, piperazine, piperidine and morpholine radicals; and $x$ and $y$ are whole numbers greater than 0 that total 2 to 4; which process comprises subjecting a moisture- and acid-gas-containing ester which will yield such an amide, which ester has a boiling point substantially above that of water, to a temperature of at least about 75° C. and a pressure of no more than 500 mm. of mercury, which temperature and pressure approach that at which water will vaporize, until substantially all moisture and said acid gas have been removed therefrom, and then, without further heating, reacting the resulting ester with an amine selected from the class consisting of dimethyl amine, diethyl amine, di-n-propyl amine, methyl ethyl amine, methyl n-propyl amine, ethyl n-propyl amine, piperazine, piperidine and morpholine in the presence of an alkoxide of an alkali metal.

2. The process of claim 1 in which the amine is dimethyl amine.

3. The process of claim 1 in which the ester is an ester of an acid having the formula RCOOH in which R is an aliphatic radical.

4. The process of claim 1 in which the ester is an ester of an acid having the formula RCOOH in which R is an aromatic radical.

5. The process of claim 1 in which the amine and alkoxide of an alkali metal are added to the ester while still warm from the degassing and dehydration.

6. The process of claim 1 in which the amine is added to the degassed and dehydrated mixture after cooling to a temperature approaching room temperature.

References Cited

UNITED STATES PATENTS

| 2,464,094 | 3/1949 | Meade | 260—404 |
| 2,844,609 | 6/1955 | Tesoro | 260—404 |

NICHOLAS S. RIZZO, *Primary Examiner.*

JOSE TOVAR, *Assistant Examiner.*

U.S. Cl. X.R.

260—557, 558, 559, 561, 246, 247.2, 247.7, 294.7, 268, 294